US008468320B1

(12) United States Patent
Stringham (10) Patent No.: US 8,468,320 B1
(45) Date of Patent: *Jun. 18, 2013

(54) SCALABILITY OF DATA DEDUPLICATION THROUGH THE USE OF A LOCALITY TABLE

(75) Inventor: Russell R. Stringham, Orem, UT (US)

(73) Assignee: Symantec Operating Corporation, Mountain View, CA (US)

( * ) Notice: Subject to any disclaimer, the term of this patent is extended or adjusted under 35 U.S.C. 154(b) by 1009 days.

This patent is subject to a terminal disclaimer.

(21) Appl. No.: 12/164,965

(22) Filed: Jun. 30, 2008

(51) Int. Cl.
*G06F 12/02* (2006.01)
*G06F 12/16* (2006.01)

(52) U.S. Cl.
USPC ............ 711/170; 711/162; 711/E12.001; 711/E12.103; 707/610; 707/664

(58) Field of Classification Search
None
See application file for complete search history.

(56) References Cited

U.S. PATENT DOCUMENTS

| 6,141,728 | A * | 10/2000 | Simionescu et al. ........... 711/113 |
| 6,269,381 | B1 | 7/2001 | St. Pierre et al. ...... 707/999.202 |
| 6,898,685 | B2 * | 5/2005 | Meiri et al. .................... 711/167 |
| 7,519,635 | B1 | 4/2009 | Haustein et al. ........ 707/999.204 |
| 7,539,710 | B1 | 5/2009 | Haustein et al. ........ 707/999.204 |
| 7,567,188 | B1 | 7/2009 | Anglin et al. ........... 707/999.202 |
| 2008/0005141 | A1 * | 1/2008 | Zheng et al. ................... 707/101 |
| 2008/0244204 | A1 | 10/2008 | Cremelie et al. .............. 711/162 |
| 2009/0007261 | A1 | 1/2009 | Smith .............................. 726/21 |
| 2009/0013129 | A1 * | 1/2009 | Bondurant ..................... 711/115 |
| 2009/0041230 | A1 | 2/2009 | Williams ................ 707/999.204 |
| 2009/0055595 | A1 * | 2/2009 | Gill et al. ....................... 711/137 |
| 2009/0164529 | A1 | 6/2009 | McCain .................. 707/999.204 |
| 2009/0234892 | A1 | 9/2009 | Anglin et al. ........... 707/999.201 |
| 2009/0265399 | A1 | 10/2009 | Cannon et al. ......... 707/999.205 |
| 2009/0271454 | A1 * | 10/2009 | Anglin et al. .................. 707/204 |
| 2010/0036887 | A1 | 2/2010 | Anglin et al. .............. 707/999.2 |
| 2010/0042790 | A1 | 2/2010 | Mondal et al. ................. 711/161 |
| 2010/0070478 | A1 | 3/2010 | Anglin .......................... 707/674 |

OTHER PUBLICATIONS

Sean Quinlan and Sean Dorward, "Venti: a new approach to archival storage," USENIX Association, "Proceedings of the FAST 2002 Conference on File and Storage Technologies," Monterey California, Jan. 28-30, 2002, © 2002 by The USENIX Association, 13 pp.
Zhu et al., "Avoding the Disk Bottleneck in the Data Domain Deduplication File System," Abstract, *to appear in the Proceedings of the 6th USENIX Conference on File and Storage Technologies (Fast '08)*, San Jose, California, Feb. 2008, pp. 1-13.

* cited by examiner

*Primary Examiner* — Michael Krofcheck
(74) *Attorney, Agent, or Firm* — Campbell Stephenson LLP (57) ABSTRACT

Methods for utilizing a locality table when performing data deduplication are disclosed. One method involves accessing a locality table stored in memory. The locality table includes several signatures, each of which identifies one of a several data units that were consecutively added to a deduplicated data store on a persistent storage device. The method then involves searching the locality table for a new signature of a new data unit, in order to determine whether a copy of the new data unit is already present in the deduplicated data store. If the new signature is not found in the locality table, a pointer table is accessed. The pointer table indicates a subset of a set of signatures stored on the persistent storage device. In response to accessing the pointer table, the subset of the set of signatures, indicated by the pointer table, is searched for the new signature.

25 Claims, 4 Drawing Sheets

SCALABILITY OF DATA DEDUPLICATION THROUGH THE USE OF A LOCALITY TABLE

FIELD OF THE INVENTION

This invention relates to storage systems and, more particularly, to performing data deduplication within a storage system.

DESCRIPTION OF THE RELATED ART

Data deduplication is a technique that is used to reduce the amount of storage space required in a system by detecting redundant copies of the same data and preventing multiple copies of the same data from being stored. For example, data deduplication is often used to reduce the amount of storage space needed to maintain backups of an organization's data.

In order to perform data deduplication, a system needs to be able to identify redundant copies of the same data. Because of the processing requirements involved in comparing each incoming unit of data with each unit of data that is already stored in the deduplication system, the detection is usually performed by comparing smaller data signatures of each data unit instead of comparing the data units themselves. This generally involves calculating a new signature (e.g., a hash or checksum) for each unit of data to be stored on the deduplication system and then comparing that new signature to the existing signatures of data units already stored by the deduplication system. If the new signature matches an existing signature, it indicates that a copy of the unit of data is likely to be already stored in the deduplication system (additional comparisons may be needed to verify this, in certain circumstances).

Unfortunately, existing techniques for detecting redundant copies often reduce system performance. For example, for a New Technology File System (NTFS) file system, each cluster is typically 4 Kilobytes (KB) in size. Attempting to apply data deduplication to a file system having clusters of that size requires that the unit size used for checking for duplicate data units be no larger than one cluster (4K) in size (while other sizes can be used to check for redundant copies, attempting to use sizes larger than the file system's cluster size typically results in significantly reduced rates of data reduction). A data deduplication system that contains 8 Terabytes (TB) of unique data will contain 2 billion 4K blocks. If each block's signature is 160 bits (20 bytes) in size, then storing just the signatures requires 40 GB of memory. As a result, these signatures cannot be held in computer memory on any but the most expensive computer systems. Accordingly, when processing a new data unit, one or more disk input and/or output operations (I/Os) are likely to be needed to search for the data unit's signature to determine if the new data unit is already stored by the deduplication system. Additionally, because each signature is likely to be far different from the signatures processed before and after it (e.g., if a hash function is used to generate the signatures), there will be little locality of reference among signatures and each I/O will require seeking to different parts of the disk, causing significant disk head movement and further reducing performance.

As the above example shows, once the amount of signatures becomes too large to be completely contained in memory, the distributed nature of the signatures practically guarantees that disk I/O and particularly disk seeking will begin to limit the scalability of the data deduplication system. This problem is exacerbated when smaller cluster sizes (such as the 4K size used in NTFS) are used, since the use of smaller cluster sizes results in more signatures than would be needed in a system that used a larger cluster size. Accordingly, depending upon the cluster size in use, even small data deduplication implementations can quickly exhaust available memory and suffer reduced performance due to needing to access non-localized signatures from disk.

SUMMARY OF THE INVENTION

Various embodiments of methods and systems for using a locality table when performing data deduplication are disclosed. In one embodiment, a method involves accessing a locality table stored in memory. The locality table includes several signatures, each of which identifies one of several data units that were consecutively added to a deduplicated data store on a persistent storage device. The method then involves searching the locality table for a new signature of a new data unit, in order to determine whether a copy of the new data unit is already present in the deduplicated data store. If the new signature is not found in the locality table, a pointer table is accessed. The pointer table indicates a subset of a set of signatures stored on the persistent storage device. In response to accessing the pointer table, the subset of the set of signatures, indicated by the pointer table, is searched for the new signature.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Data deduplication involves reducing the number of copies of the same data that are stored by a particular storage system.

For example, data deduplication can be used to achieve single-instance storage, in which only a single copy of each unique item of data is maintained on a storage system. Data deduplication can be performed by generating a signature for each item of data, and then using that signature to detect redundant copies of that item of data, as well as to identify where the item of data is stored. When a client attempts to store another copy of the same item of data to the storage system, the client will compare the data item's signature to the signatures of the already stored data items in order to detect whether a copy of the item of data is already stored.

The data deduplication system can track the order in which unique clusters are added to the deduplication system, and use this same ordering to create tables of signatures, which are referred to herein as locality tables. One or more such locality tables can be cached in memory. These locality tables, which store signatures of clusters that were consecutively added to the data deduplication system, are then used to detect redundant copies. The locality tables have a higher hit rate than would be achieved if the signatures were cached based upon value. Accordingly, the use of locality tables can reduce the need to access signatures on disk in order to determine whether a given unit of data is already stored by the deduplication system.

At many points in this disclosure, examples of volume-based data deduplication are provided. The same principles can be used to perform file-based or object-based deduplication. Thus, the techniques described herein can also be used to perform deduplication for particular logical objects (e.g., files), or portions of such objects, as opposed to performing deduplication on portions (e.g., clusters) of a volume or other storage device.

Figure 1:
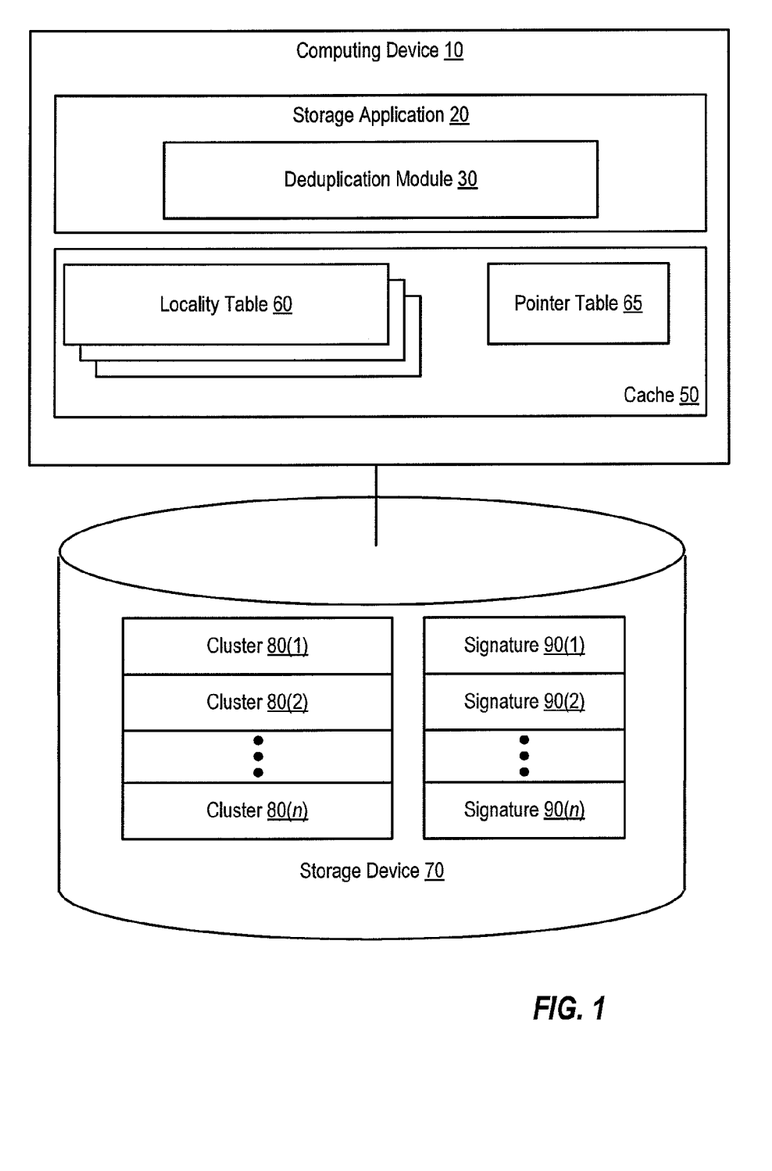
FIG. 1 is a block diagram of a system that uses a cached locality table when performing data deduplication, according to one embodiment of the present invention.

FIG. 1 illustrates a deduplication system that supports data deduplication. As shown, computing device 10 implements a storage application 20 that includes a deduplication module 30. Storage application 20 can be a file system, volume management or storage virtualization application, a stand-alone application that interfaces to a file system and/or volume management or storage virtualization application, or the like. Deduplication module 30 maintains a cache 50 that includes one or more locality tables 60 and a pointer table 65. Locality tables 60 and pointer table 65 are described in more detail below.

Computing device 10 can be a personal computer, laptop computer, server, personal digital assistant, cell phone, or the like. One or more users can use computing device 10 to generate user data, such as files. The user data can be generated by user applications (e.g., word processing programs, email programs, graphics programs, a database application, or the like) executing on computing device 10. Some of the user data may also be transferred to computing device 10 (e.g., via a network). The user data can be written to a persistent storage device, such as storage device 70.

Storage device 70 provides persistent data storage. Storage device 70 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Storage device 70 can also be a virtual or logical storage device that is implemented on such physical storage devices and/or storage systems. For example, storage device 70 can be a logical volume that is implemented on a RAID storage system. For simplicity, items stored on storage device 70 are sometimes referred to herein as being stored "on disk"; however, it is noted that it is not required that storage device 70 be a disk drive.

In this example, individual units or items of data are referred to as clusters. In some embodiments, such as the one described here, clusters each have a constant size that is equal to a cluster size used by a file system that organizes the user data. In alternative embodiments, the size of items of data can vary among different items stored by the deduplication system and/or differ from the cluster size used by the particular file system(s) in operation.

Storage device 70 stores clusters 80(1)-80($n$) (collectively, clusters 80) of user data, as well as signatures 90(1)-90($n$) (collectively, signatures 90). Each signature is an identifier of a respective cluster. Thus, signature 90(1) identifies cluster 80(1), signature 90(2) identifies cluster 80(2), signature 90($n$) identifies cluster 90($n$), and so on. Typically, each cluster 80 is unique (i.e., no two clusters stored within clusters 80 have the same value).

The value of a given cluster that is presented to storage application 20 for storage on storage device 70 can be the same as or different from the value of any other cluster. Before writing a cluster to storage device 70, deduplication module 30 determines whether a copy of the cluster is already stored by the deduplication system. If a copy of the cluster is already stored, there is no need to store an additional copy. If instead no copy of the cluster is already stored, deduplication module 30 will add the cluster to the set of clusters 80(1) through 80($n$) (e.g., by appending the new cluster as cluster 80($n$+1)).

In this example, the order in which unique clusters are written to storage device 70 is tracked by the order of the clusters within a list of clusters 80. In other words, each cluster that is written to storage device 70 is appended to the end of a list of clusters 80, such that the location of that cluster within the list indicates the order in which that cluster was written to storage device 70, relative to the other clusters stored in the list. In alternative embodiments, other techniques (e.g., involving timestamps, sequence numbers, or the like) can be used to track the order in which unique clusters are written to the deduplication system.

Deduplication module 30 uses signatures 90 to determine whether a given cluster is already stored on storage device 70. Each signature 90 can be a checksum or hash that is calculated based upon the data within the cluster. In many embodiments, signatures are generated in a manner (e.g., using a cryptographically strong, collision resistant hash function) that produces the same identifier for identical items of data, while also producing different identifiers for non-identical items of data.

By comparing the signature of a new cluster to the signatures of clusters already stored by the deduplication system, deduplication module 30 determines whether to add the new cluster to the deduplication system by writing that cluster to storage device 70. In particular, if a new cluster's signature does not match any existing signature 90, deduplication module 30 determines that the new cluster is not already stored within clusters 80. If a new cluster's signature does match an existing signature 90, deduplication module 30 determines that the new cluster is already stored and thus does not need to be written to storage device 70 (in some situations, such as those in which checksums are used as signatures, this determination may also involve comparing the new cluster to the existing cluster(s) that are identified by the matching signature).

Thus, when a new cluster is presented (e.g., as part of a file being written to storage device 70) to the deduplication system of FIG. 1, deduplication module 30 calculates the signature of that new cluster and compares the new cluster's signature to the signatures 90 of clusters 80 already stored within storage device 70. To reduce the need to access storage device

70 to obtain existing signatures for this comparison, deduplication module 30 caches some of signatures 90 in one or more locality tables 60 in memory 50. Deduplication module 30 compares the new signature to the cached signatures in locality table(s) 60. If a match is found, deduplication module 30 determines (in some cases, after further comparing the new cluster to the existing cluster identified by the matching signature) that the new cluster is already stored on storage device 70.

If no match for the new signature is found in locality table(s) 60, data deduplication module 30 searches the remaining signatures, stored on storage device 70, for a matching signature (this search may be initiated in parallel with the access to the cached locality table(s) in some embodiments). In some embodiments, deduplication module 30 caches a pointer table 65 in order to expedite this process. Pointer table 65 can cache information that indicates where, within the list of signatures 90, a desired signature is likely to be found. More details of pointer table 65 are provided below.

If the matching signature is found within signatures 90 on storage device 70, but that matching signature is not already cached, deduplication module 30 can cause one of the cached locality tables to be replaced with the locality table that includes the matching signature. If more than one locality table can be cached at a time, deduplication module 30 can implement a least recently used (LRU) replacement policy (other replacement policies can alternatively be used, if desired). Accordingly, deduplication module 30 can maintain state information for each cached locality table in order to track how recently the cached locality tables have been used (e.g., in terms of cache hits that occur when a matching signature is found in a locality table) relative to each other in order to implement an LRU cache replacement policy.

As noted above, a given locality table stores the signatures of unique clusters that were consecutively written to the deduplication system. Accordingly, instead of being grouped based upon, for example, value, the signatures within a given locality table are grouped based upon the relative order in which their corresponding clusters were added to the list of clusters 80. As also noted above, clusters can be added to the list of clusters 80 by appending new clusters to the end of the list. In such embodiments, the signatures for the new clusters can similarly be appended to the list of signatures 90, such that the order of signatures within the list indicates the order in which the clusters corresponding to those signatures were added. If instead other techniques (e.g., such as timestamps or sequence numbers) are used to track the order in which clusters are added to the deduplication system, similar techniques can be used to track the order in which the corresponding signatures are added.

Deduplication module 30 groups signatures into locality tables such that signatures identifying consecutively-added clusters will be in the same locality table. In embodiments in which new signatures are appended to a list of existing signatures 90, this grouping can be performed by simply subdividing the list of existing signatures into tables of consecutive signatures (e.g., 1024 signatures can be included in each group, such that signatures 90(1)-90(1024) (not shown) are in the first table, signatures 90(1025)-90 (2048) (not shown) are in the second table, and so on). This technique also allows different groups to be ordered relative to each other. It is noted that once signatures have been grouped into tables, the ordering of signatures within a given table may be modified in certain situations, as described further below. If needed, information identifying the groupings of signatures (e.g., by identifying which signatures are included in each table through the use of addressing or other information) into locality tables can be stored on storage device 70 in a manner that allows individual locality tables to be constructed and loaded into cache 50.

If the order of signatures within a list of signatures does not indicate the order in which their corresponding clusters were added to the deduplication system, other information can be used to group the signatures into locality tables. For example, if each signature has an associated timestamp (e.g., indicating the time at which the cluster identified by that signature was added to the deduplication system), the signatures can be sorted into ascending timestamp order and then the sorted signatures can be grouped into tables. Similarly, if each signature has an associated sequence number (e.g., where ascending sequence numbers are assigned to consecutively added clusters and their associated signatures), the signatures can be sorted into ascending sequence number order and then grouped into tables. These techniques also allow tables to be ordered relative to each other.

Grouping signatures into locality tables based upon the order in which the clusters identified by those signatures were added (i.e., written) to the deduplication system increases the likelihood that a signature will be found in the currently cached locality table if the previously generated signature was also found in the currently cached locality table. This likelihood exists because the existence of duplicate files makes it likely that the same sequence of clusters will be handled multiple times. In general, while the signatures of a group of consecutively added clusters are likely to have very different values, there is a very high correlation between the order in which clusters are written and the order in which those clusters will appear when accessed again. Accordingly, when deduplication module 30 is processing new clusters, if deduplication module 30 processes a cluster that is already stored on storage device 70, there is a high probability that the next cluster that deduplication module 30 processes will be the same as the one that was processed immediately after this previously seen cluster when the previously seen cluster was first added to storage device 70.

In some situations, locality tables can be loaded from storage device 70 into cache 50 in situations other than misses (i.e., the failure to find a match for a signature) in the currently loaded locality tables. For example, in situations in which locality tables are ordered relative to each other, if the most recently added signature (i.e., the last signature or the signature corresponding to the cluster that was most recently added to storage device 70, relative to the other clusters identified by signatures in the same locality table) within a given locality table is a match for a signature of a new cluster being processed by deduplication module 30, deduplication module 30 can preemptively load the next consecutive locality table from storage device 70 into cache 60, since the next signature that is likely to be generated is the signature of the first (in relative order) signature of the next consecutive locality table. Thus, if the current cached locality table caches signatures 90(1)-90(1024), and if deduplication module 30 matches the signature of a new cluster to signature 90(1024), deduplication module 30 can preemptively load the next locality table, containing signatures 90(1025)-90 (2048), into cache 50.

As noted above, more than one locality table may be stored in cache 50 at the same time. This provides advantages when situations arise in which a few, but not all, of the clusters in a stream of clusters are modified before being rewritten to the deduplication system. In other words, if only one locality table is cached at a time, and if a certain cluster ordering is established and then later an additional cluster is added between two previously consecutively processed clusters, the locality table would be replaced upon the first miss (when the first inserted cluster was processed) and then reloaded into the cache when the next cluster after the inserted cluster(s) was processed. If multiple locality tables are stored in cache 50, the locality table would not need to be removed from the cache and then subsequently reloaded.

The appropriate number of locality tables to keep in memory is likely to be relatively small. For example, if the deduplication system stores 8 Terabytes of data, there are 1024 signatures per table, and the cluster size is 4K, the deduplication may have two million locality tables, yet it may be desirable to only cache up to ten or so locality tables at any given time. Having more tables cached may result in more processing time being spent searching those cached tables, often in vain, for a match. Determining the appropriate number of tables for a given system can be determined, for example, through benchmarking tests or simulation.

The locality tables themselves can be organized in a variety of different ways. In one embodiment, signatures within each locality table are arranged in the order in which the clusters identified by those signatures were added to the deduplication system. Accordingly, the mere position of a signature within a locality table indicates the order in which the cluster identified by that signature was added to the deduplication system, relative to other clusters identified by other signatures within the same locality table. Furthermore, if the clusters are similarly arranged in consecutive order, the position of the signature within the locality table, and the relative order of that locality table within a set of locality tables, can be used to locate the corresponding cluster within deduplication system.

In embodiments like this, only signatures (as opposed to signatures plus other information, such as timestamps, sequence numbers, and/or addressing or other location information used to locate corresponding clusters) may be stored in locality tables. In such embodiments, deduplication module 30 can search the locality tables by performing a linear search for a matching signature, and then using the position of that signature within the table to locate the corresponding cluster, if needed.

In other embodiments, additional information (such as timestamps, sequence numbers, and/or addressing or other location information used to locate corresponding clusters) can be stored in the locality tables. In at least some such embodiments, the signatures can be rearranged within the locality table. For example, if each signature is associated with a respective timestamp, the timestamps can be used to group signatures into locality tables, as described above. The signatures within the resulting locality tables can then be sorted in ascending or descending order. The timestamp associated with each signature will indicate the relative temporal order (and can also be used to locate the corresponding cluster, if clusters and their signatures share the same timestamps) of the signatures. However, the newly sorted arrangement of the signatures allows deduplication module 30 to search for a signature by performing a binary search of the locality table rather than a linear search.

In embodiments in which only signatures are maintained, generation of locality tables can involve generating additional information that identifies the original position of each signature within the locality table, storing the appropriate additional information with each signature, and then rearranging the signatures. For example, in one embodiment, each signature is supplemented with information identifying the original position (e.g., from zero to 1023 within a 1024 entry locality table) of that signature within the locality table. The supplemented signatures within each locality table can then be sorted in order to facilitate binary searching. Meanwhile, the supplemental information allows the original temporal ordering to be identified, which can in turn allow deduplication module 30 to locate the cluster corresponding to each signature.

Another technique that deduplication module 30 can use to expedite processing is to check whether each new cluster that is provided to the deduplication system has a predefined value, prior to searching for a matching signature for that new cluster within the locality tables. This processing can be performed prior to or in conjunction with signature generation, for example. In one embodiment, this processing involves parsing the cluster to determine whether, for example, each bit or byte in the cluster has the same value (other patterns, such as repeating 32-bit values, can also be checked for). If so, deduplication module 30 can avoid adding the cluster to storage device 70. Instead, deduplication module 30 can simply store state information indicating the cluster had a particular predefined value. If a user later accesses the cluster, deduplication module 30 can simply regenerate the cluster on the fly based upon this state information. In this embodiment, no locality table information corresponding to the predefined clusters needs to be maintained, and these special clusters can be handled without accessing either cached or on-disk locality tables.

In an alternative embodiment, predefined clusters are preallocated in the list of clusters 80, and their corresponding signatures are preallocated in the list of signatures 90 (e.g., as part of the system configuration). In these embodiments, deduplication module 30 will calculate a signature normally and detect that the cluster is already stored. Since these predefined blocks are likely to occur somewhat frequently and to not necessarily follow preset access patterns each time they are encountered, a separate locality table that includes only signatures of predefined blocks can be cached. In at least some embodiments, this locality table may be configured to remain in cache 50 permanently instead of being swapped in and out according to a cache replacement policy.

As noted above, pointer table 65 can also be used to expedite processing of new clusters being presented to a deduplication system. Pointer table 65 includes information, which is indexed or otherwise searchable based upon a portion of the signature generated for a new cluster, that indicates (e.g., by specifying an address or offset) which of several subsets of signatures is likely to contain the signature of the new cluster. For example, if signatures are kept in a list like that shown in FIG. 1, the pointer table 65 can store information indicating offsets within the list. By using pointer table 65 to identify a particular subset of signatures, deduplication module 30 can avoid having to search all of the on-disk signatures if there is a miss for the new signature in the cached locality table(s). In particular, the use of pointer table 65 can reduce the amount of I/O activity needed for deduplication module 30 to determine whether a new data unit is already stored by the deduplication system.

In some embodiments, a separate sorted copy of all of the signatures is maintained on storage device 70 (e.g., in addition to a temporally-ordered copy like the list of signatures 90 shown in FIG. 1), and pointer table 65 identifies a subset of the signatures within the sorted copy. Since the sorted copy is already sorted, subsets of the sorted copy can be searched using a binary search.

In one embodiment, pointer table 65 is organized as array. For example, pointer table 65 can be a 32-bit array with $2^{24}$ entries, which requires 64 MB of memory. This example configuration is referred to several times below; however, it is noted that other configurations can also be implemented.

For an empty deduplication system in which no clusters have yet been written to storage device 70, each entry is initialized with a value of zero. The value in each entry represents the index of an on-disk structure, which stores a subset of a sorted list of signatures. In one embodiment, the on-disk structures are all contained within a single flat file, and each structure is 32K in size, so multiplying the on-disk index value by 32K gives the location within this signature file which contains the desired on-disk structure. Other data structures and sizes can be used in other embodiments.

A sample implementation, in which signatures are 160 bits in size, for the entries in pointer table 65 and the on-disk structures could be:

```
struct Entry {
char signature [20];
char index [5];
};
struct OnDiskStruct {
uint16_t count; //num of used Entry objects
uint32_t nextStruct; //index of next structure
Entry entries [1310]; //sorted by signature
char padding [12]; //bring size to 32K
};
```

If there are initially no clusters stored by the deduplication system, the flat file can be initialized with a single instance of the on-disk structure ("OnDiskStruct") where the entries field is set to zero and the nextStruct is set to −1 (or another predefined value), representing no next structure.

To determine if a particular signature is already present in the deduplication system of this example, deduplication module 30 can use the first 24 bits of the 160 bit signature to index into the in-memory pointer table 65 (e.g., deduplication module 30 can search the index portion of each Entry for a value that matches the first 24 bits of the signature). The entry found in pointer table 65 at this index can be multiplied by 32K (the size of the on-disk structures) to determine an offset in the flat file. Deduplication module 30 can then read 32K (again, the size of the on-disk structure) from this offset. This 32K section contains the subset of the signatures identified by the pointer table 65, given the new signature being processed by deduplication module 30.

Deduplication module 30 can then perform a binary search of the signatures in the subset for the new signature. If the new signature is found, then the Entry index (in OnDiskStruct) provides a 40-bit value (e.g., an offset into a list of clusters) indicating where the associated cluster is located on storage device 70. In one embodiment, this 40-bit value can be multiplied by 4K (the cluster size) to give the offset within a flat file that contains the actual clusters, thus allowing this file to contain up to $2^{40}$ 4K blocks or $2^{52}$ bytes. In another embodiment, the index of the Entry contains the index of the locality table that contains this signature, and that locality table must be loaded to find the actual location of the cluster within the data store. In this case, the index's size can be smaller, perhaps only 3 or 4 bytes.

If the new signature is found, deduplication module 30 can load the corresponding locality page containing that signature (e.g., as determined using the offset into the list of clusters to locate the appropriate cluster and its corresponding signature within the on-disk locality tables) into memory. Deduplication module 30 can also determine that the new cluster is already stored by the deduplication system and thus does not need to be added to storage device 70.

In some implementations, if the signature is larger than the largest signature in the on-disk structure identified by pointer table 65, then the on-disk structure indicated by the nextStruct value must also be loaded and checked by deduplication module 30 (e.g., this determination can be made by simply comparing the new signature to the last signature in the structure). If the in-memory and on-disk structure are properly configured (e.g., in terms of entry size and number of entries per structure, as determined using, for example, simulation or benchmark testing) for the number of signatures, then due to the distribution of signatures, it is extremely unlikely that the signature would also be larger than the largest signature in this next structure.

If the signature is not found in any on-disk structure (thus indicating that the signature is also not in any non-cached locality table), then the new cluster is not contained within the deduplication system and deduplication module 30 will add the new cluster and its signature to storage device 70.

Deduplication module 30 can also update the on-disk structures that store the sorted signatures each time a new signature is added to the deduplication system. In the example above, the structures are each configured to contain 1310 entries. If there are fewer than 1310 (or other maximum number of) entries in the structure that was identified by pointer table 65 and searched for the new signature, deduplication module 30 can insert a new entry into the appropriate location in that structure, maintaining its sorted order, and write the structure back to storage device 70. If instead there are already 1310 (or other maximum number of) entries in the structure, then there is no room for a new entry in the current structure. In such situations, deduplication module 30 can allocate a new structure (e.g., at the end of the flat file containing the structures) and put the second half of the entries from the current structure into the new structure, while also inserting the new entry into the appropriate structure. The nextStruct attribute of the new structure can be set equal to the current nextStruct attribute of the current structure. Then, the nextStruct attribute of the current structure can be set equal to the index of the new structure.

When a new structure is added, deduplication module 30 can then extract the first 24 bits of the signature of the last entry remaining in the current structure. The in-memory pointer table can then be updated so that all values in the table starting one number higher than this 24-bit value and continuing through all entries that point to the current structure are updated to point to the new structure.

As mentioned earlier, when checking for a signature in a structure, if the signature value is higher than the highest entry in the structure, then the next structure may also be checked. The likelihood of needing to access this next structure can be reduced if, when a structure is split, rather than splitting the structure evenly, deduplication module 30 attempts to split the structure so that all entries that share the same first 24 bits go into the same structure.

In one configuration using the above structure definition (i.e., with a maximum of 1310 entries), the structures are typically about three-quarters full (e.g., about three-quarters of the entries of each structure are allocated and have valid values). Deduplication module 30 can be configured to split structures in a manner that increases the utilization of one or both of the structures that result from the split (e.g., by maximizing the number of allocated entries in one of the resulting structures).

While the above example focused on pointer tables having 32 bits per entry and 32K structures, other embodiments can use other pointer table and/or structure sizes. For example, 32 bit entries may be satisfactory in configurations having 16 TB of unique data and a 4K cluster size (which leads to about four billion signatures for the system). In systems handling larger amounts of data, increased pointer table size may be desirable. For example, for each power of 2 in which the number of signatures expected in a given configuration exceeds four billion, it may be desirable to add an additional bit to the pointer table size or to double the size of the structures. Thus, for an implementation having 8 billion signatures, the pointer table size could be 25 bits and/or the structures could be 64K in size.

In one embodiment, each structure is limited to storing only those signatures that have one or more identical bytes (e.g., one embodiment may require that all signatures in the same structure have the same first two bytes). The value of the identical byte(s) can be stored a single time in the structure and omitted from the individual entries in the structure. This allows more signatures to be represented in the structure than would otherwise be possible, since redundant information does not need to be stored multiple times.

The use of a pointer table can significantly increase the likelihood that only a single I/O operation to read an on-disk structure (or possibly two such I/O operations in certain circumstances like those described above) will be needed to determine whether a new data unit is already stored by a deduplication system. This increases the performance of the deduplication system relative to systems that must read all signatures until a matching signature is found, since signature matching in those systems is likely to involve significantly more than one I/O operation. Additionally, the relatively small size of the pointer table does not adversely impact the memory requirements of the system in which the pointer table is implemented. For example, in embodiments configured like the example described above, only 64K of memory is needed to store a pointer table that handles 4 billion signatures.

While the above examples have focused on using volume-based deduplication, file-based deduplication can also make use of locality tables. In these situations, the items of data can be individual files or portions of files, and the signatures can similarly correspond to signatures of those files or portions of files.

In the example of FIG. 1, a single computing device implements the data deduplication module. In alternative embodiments, at least a portion of the deduplication module may be implemented in a distributed fashion. For example, a deduplication client may be configured to perform certain functions, such as generating signatures of new clusters, while a deduplication server can be configured to perform other functions, such as maintaining and using (based upon, for example, signatures received from a deduplication client) the locality table(s) and pointer table described above.

Figure 2:
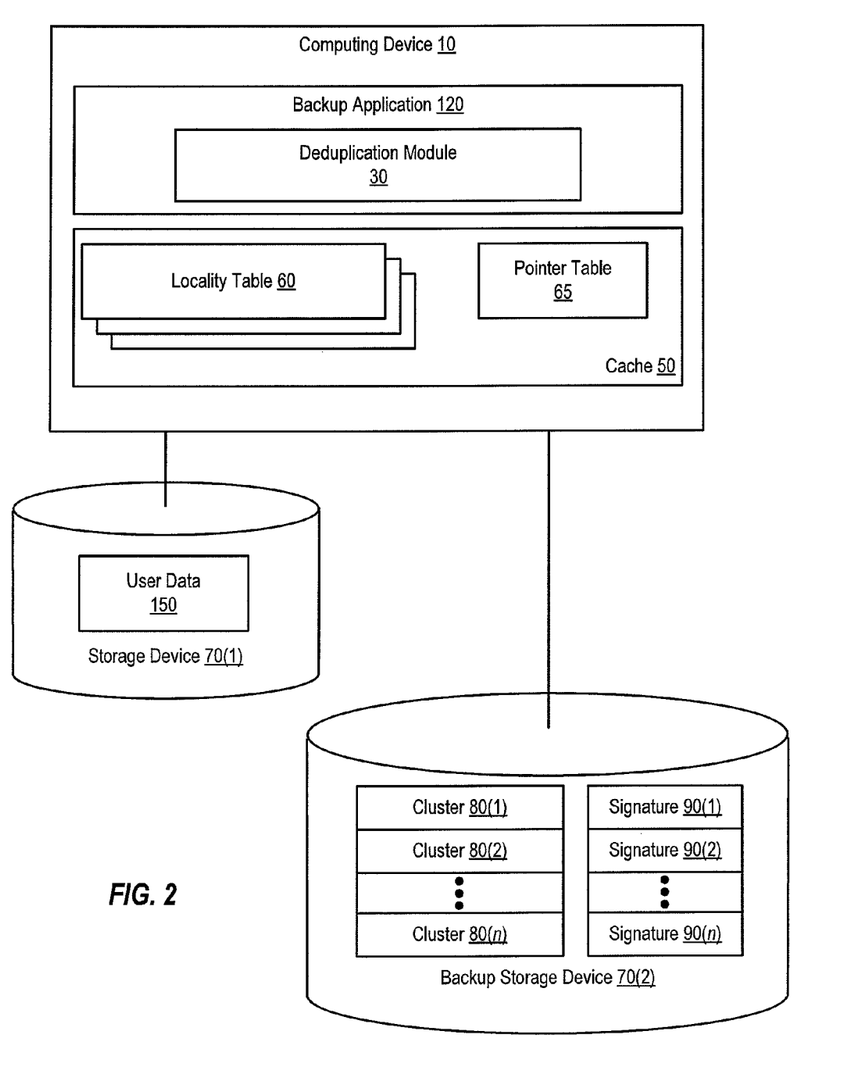
FIG. 2 is a block diagram of another system that uses a cached locality table when backing up data to a data deduplication system, according to one embodiment of the present invention.

FIG. 2 shows an example of a backup system that performs deduplication using locality tables. Many of the components of FIG. 2 are similar to those shown in FIG. 1 and have been given similar numbers. Descriptions of these components can be found in the description of FIG. 1.

In this example, the deduplication system performs deduplication on user data that is backed up. Accordingly, deduplication module 30 is part of a backup application 120 such as Backup Exec System Recovery (BESR), available from Symantec Corporation of Cupertino, Calif. Alternatively, deduplication module 30 can be an independent module that interfaces to such a backup application.

Backup application 120 routinely (e.g., periodically or in response to predefined stimuli, such as an administrator generating a request for a backup at a particular time) generates backups of user data 150 stored on storage device 70(1) and writes those backups to storage device 70(2). The backup data is deduplicated prior to storage on storage device 70(2) in order to reduce the amount of space needed on storage device 70(2) to store backups.

As noted above, the use of locality tables increases the likelihood that consecutively generated signatures will match cached signatures in the locality table. This trend is also true in backup systems. For example, suppose a volume-based backup is performed on a system and all of the used data clusters within a volume are sent to a deduplicated backup system. Later, when this same system is backed up again, large runs of the clusters will be sent to the deduplication database in the same order as those clusters were previously sent. While most clusters will have identical positions, there will be some changes, due to the addition of new files, the deletion of old files, and the editing of existing files. Also, some groups of clusters will be relocated, due to the copying of files, and disk defragmentation. However, despite these changes, the ordering of the clusters within each of these groups will often be the same as it was previously.

If the deduplication system stores backups for multiple different clients (e.g., different user machines), additional efficiencies can be realized, since there is also a high correlation between clusters on different clients. Individual files are usually unfragmented such that all clusters within a file that is common to two clients will be arranged in the same order on each client. In addition, application installs will have copied the same set of files to both clients in the same order and the file system will place the data making up the set of files in consecutive clusters on disk, resulting in the same ordering of clusters included in files that are common to two clients. Additionally, in an enterprise environment, most machines in a department will have been configured from a common deployment image or configured similarly by a computer manufacturer. In these situations, the initial layouts will often be nearly identical and there will be a very high locality correlation.

When portions of files are used (instead of portions of a volume, such as clusters) as the items of data being deduplicated, consecutive portions of a common file will often have the same order within the locality table, resulting in lookups for partial file signatures possibly causing no more I/O than would be incurred if using signatures for complete files. Additionally, the files within a directory, especially if processed in alphabetical order, will often have a strong locality correlation when this directory is processed as part of a future backup. Also, when one of these files is seen on a different machine, it is likely that others of these files will be in the same directory (in the same order) on that other machine, resulting in an additionally increased hit rate in the locality table.

Figure 3:
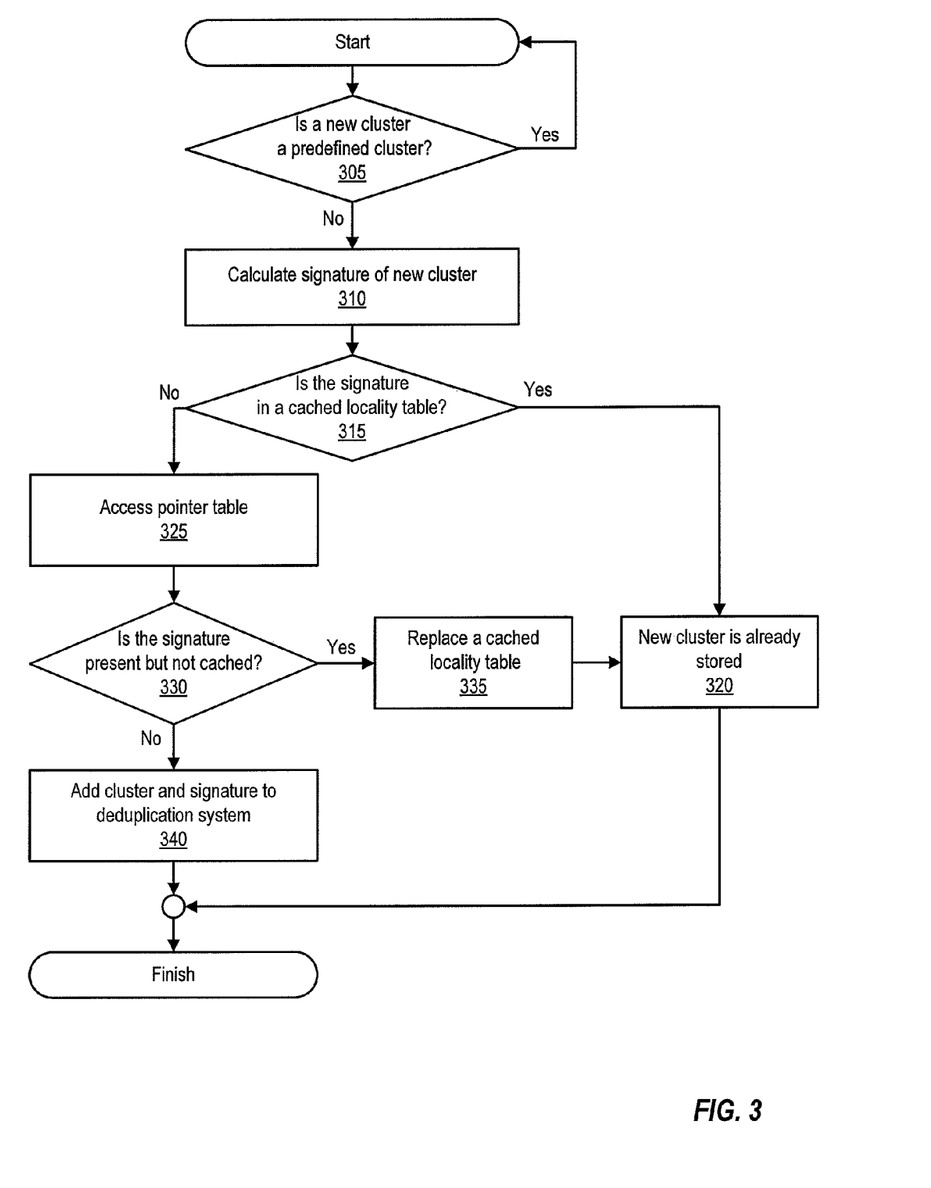
FIG. 3 is a flowchart of a method of performing data deduplication using a cached locality table, according to one embodiment of the present invention.

FIG. 3 is a flowchart of a method of performing data deduplication using one or more cached locality tables. This method can be performed by a deduplication module like those shown in FIGS. 1 and 2. The method can be used to detect whether a cluster (or other unit of data) is already stored by a deduplication system.

The method begins in response to a new cluster being presented to a deduplication system for storage in a deduplicated data store. In one embodiment, the deduplication system is configured to avoid storing certain predefined clusters (e.g., clusters having constant, predefined values). In such embodiments, operation 305 can be performed (e.g., by parsing the new cluster to see if all bits and/or bytes have the same value, or whether the cluster satisfies any other predefined pattern) in order to determine whether the new cluster is a predefined cluster. If so, there is no need to store the new cluster in the deduplicated data store.

Some embodiments may omit operation 305. For example, many embodiments may calculate signatures for all new clusters, even those that have predefined values.

At 310, the signature of the new cluster is calculated (e.g., by calculating a hash or checksum of the new cluster). The new signature is compared to signatures stored in one or more cached locality tables, as shown at 315. If the new signature is present in the cached locality table, it is likely (or perhaps even certain, if the signature is a cryptographically strong hash) that the new cluster identified by that signature is already stored in the deduplicated data store, as indicated at 320. Accordingly, there is likely to be no need to add the new cluster to the deduplicated data store. If necessary, additional checks (e.g., such as comparing the new cluster to an existing cluster identified by the matching signature) can be performed to verify that the new cluster is in fact already stored. As noted above, searching the cached locality table(s) can involve performing linear or binary searches, depending on the embodiment.

If the cached locality table(s) do not store the new signature, then a cached pointer table can be accessed, as shown at 325. The new signature can be used to search the pointer table for information corresponding to the new signature (e.g., by using a portion of the new signature as an index into the pointer table). The identified information, if any, within the pointer table identifies a subset of (i.e., fewer than all) on-disk signatures. The identified subset is likely to contain the new signature.

Accordingly, in response to the information in the pointer table, a subset of on-disk signatures can be accessed. Based upon this subset, a determination can be made at 330 as to whether the new signature is present within the deduplication system but not currently cached in a locality table. If no corresponding information is found in the pointer table, all of the on-disk signatures may be searched to make this determination.

If the new signature is already present, a cached locality table can be replaced with an on-disk locality table that contains the new signature, as shown at 335. If fewer than the maximum number of locality tables are currently cached, the on-disk locality table containing the new signature can instead simply be loaded into memory without replacing any already cached locality table. Since the new signature is already present, a determination can also be made (in some embodiments, after performing additional checks) that the corresponding new cluster is also already stored by the deduplication system, as indicated at 320.

If the new signature is not found within the identified subset (or the entire set of signatures, if no subset was identified in the pointer table), then it indicates that the new cluster is not already stored in the deduplicated data store. Accordingly, the new cluster and its new signature are added to the deduplicated data store, as indicated at 340. If a pointer table is being used, the pointer table and any associated on-disk structures (e.g., such as structures presenting a sorted list of signatures) can also be updated to reflect the addition of the new signature.

Figure 4:
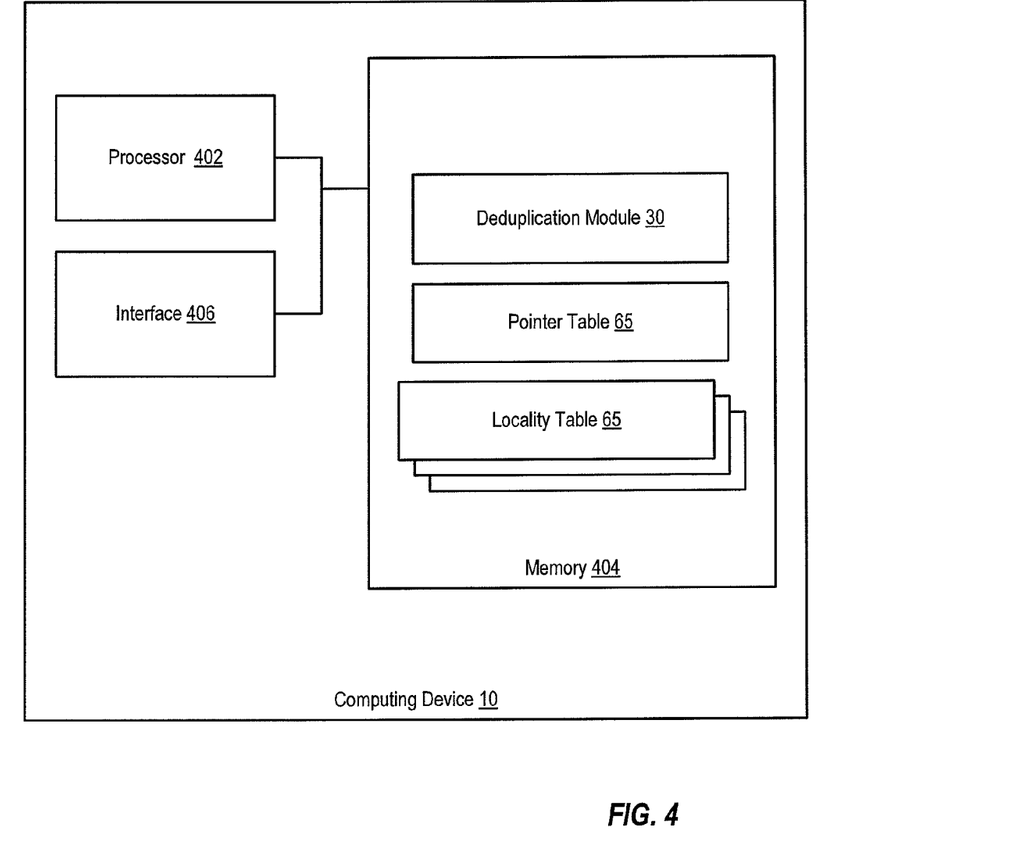
FIG. 4 is a block diagram of a computing device that implements a storage client that performs data deduplication using a cached locality table, according to one embodiment of the present invention.

FIG. 4 illustrates how certain elements of a deduplication system can be implemented in software. FIG. 4 is a block diagram of a computing device 10 (e.g., as shown in FIG. 1 and/or FIG. 2). As illustrated, computing device 10 includes one or more processors 402 (e.g., microprocessors, PLDs (Programmable Logic Devices), or ASICs (Application Specific Integrated Circuits)) configured to execute program instructions stored in memory 404. Memory 404 can include various types of RAM (Random Access Memory), ROM (Read Only Memory), Flash memory, MEMS (Micro Electro-Mechanical Systems) memory, magnetic core memory, and the like. Memory 404 can include both volatile and non-volatile memory. Computing device 10 also includes one or more interfaces 406. Processor 402, interface 406, and memory 404 are coupled to send and receive data and control signals by a bus or other interconnect.

Interface 406 can include a network interface to various networks and/or interfaces to various peripheral buses. Interface 406 can also include an interface to one or more storage devices (e.g., storage device 70 of FIG. 1 and storage device 70(1) and 70(2) of FIG. 2). Interface 406 can, for example, be used to access information, such as clusters, locality tables, and signatures, stored on a storage device, and/or to add clusters and signatures to a storage device. Similarly, interface 406 can be used to communicate with a client's web browser or other user interface if deduplication module 30 is executing remotely from another computing device.

In this example, all or part of certain deduplication system functionality, including a deduplication module 30, one or more locality tables 60, and/or a pointer table 65, are stored in memory 404 and can be implemented in software. Deduplication module 30 can generate locality tables 60 and/or pointer table 65 throughout the operation of the deduplication system. Additionally, deduplication module 30 can be configured to swap locality tables in and out of memory according to a desired cache replacement policy.

As noted above, in some embodiments deduplication module 30 implements one or more cryptographic hash algorithms that can be applied to an item of data in order to generate a signature of that data. In one embodiment, deduplication module 30 implements a version of Secure Hash Algorithm (SHA), such as SHA-1. In other embodiments, other cryptographically secure (e.g., relatively collision resistant and non-invertible) hash algorithms can be implemented. Examples of hash algorithms that can be used by deduplication module 30 include (but are not limited to) Message Digest algorithm 5 (MD5), SHA-1, SHA-224, SHA-256, SHA-384, SHA-512, Research and Development in Advanced Communications Technologies in Europe (RACE) Integrity Primitives Evaluation Message Digest (RIPEMD), RIPEMD-128, RIPEMD-160, RIPEMD-250, RIPEMD-320, and RIPEMD-512.

The program instructions and data implementing deduplication module 30 can be stored on various computer readable storage media such as memory 404. In some embodiments, such software is stored on a computer readable storage medium such as a CD (Compact Disc), DVD (Digital Versatile Disc), hard disk, optical disk, tape device, floppy disk, and the like). In order to be executed by processor 402, the instructions and data implementing deduplication module 30 can be loaded into memory 404 from the other computer readable storage medium. The instructions and/or data implementing deduplication module 30 can also be transferred to computing device 10 for storage in memory 404 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
   generating a locality table, wherein
      the generating the locality table comprises
         sub-dividing a list of signatures into multiple groups of signatures,
      the locality table comprises a first group of signatures of the multiple groups of signatures, and the list of signatures is stored on a persistent storage device;

caching the locality table in memory, wherein each signature of the first group of signatures identifies a respective data unit of a plurality of data units that were consecutively added to a deduplicated data store on the persistent storage device;

searching the locality table for a new signature of a new data unit, wherein the new signature is used to determine whether a copy of the new data unit is already present in the deduplicated data store;

accessing a pointer table, if the new signature is not found in the locality table, wherein the pointer table stores information indicating a set of the list of signatures stored on the persistent storage device; and searching the set of the list of signatures for the new signature, in response to the accessing the pointer table.

2. The method of claim 1, wherein the searching the locality table comprises performing a binary search of the first group of signatures in the locality table.

3. The method of claim 2, further comprising accessing additional information in the locality table, wherein the additional information is associated with the new signature, wherein the additional information identifies when the copy of the new data unit was added to the deduplicated data store, relative to one or more other data units, and wherein the other data units are identified by other signatures in the locality table.

4. The method of claim 2, further comprising accessing additional information in the locality table, wherein the additional information is associated with the new signature, and wherein the additional information identifies a location of the copy of the new data unit in the deduplicated data store.

5. The method of claim 1, further comprising detecting whether the new data unit has a predefined value.

6. The method of claim 5, wherein the searching the locality table is performed in response to detecting that the new data unit does not have a predefined value.

7. The method of claim 1, further comprising prefetching a second locality table, in response to accessing a most recently created entry in the locality table.

8. The method of claim 1, further comprising loading a new locality table into the memory, in response to finding the new signature in the set of the list of signatures indicated by the pointer table, wherein the new locality table comprises the new signature.

9. The method of claim 1, wherein the accessing the pointer table comprises using a portion of the new signature as an index into the pointer table.

10. The method of claim 1, further comprising:

storing a plurality of locality tables on the persistent storage device, wherein each of the plurality of locality tables comprises one of the multiple groups of signatures, and the plurality of locality tables comprises the locality table; and caching a second locality table of the plurality of locality tables in the memory, wherein the searching the locality table further comprises searching the second locality table.

11. The method of claim 1, wherein the pointer table is cached in the memory, the pointer table comprises a plurality of table entries, and each entry of the plurality of table entries indicates one of a plurality of sets of the list of signatures stored on the persistent storage device.

12. The method of claim 1, wherein the list of signatures comprises signatures for all data units stored in the deduplicated data store on the persistent storage device.

13. A computer readable non-transitory storage medium storing executable program instructions, wherein, when executed, the executable program instructions are configured to:

generate a locality table, wherein a list of signatures is sub-divided into multiple groups of signatures, the locality table comprises a first group of signatures of the multiple groups of signatures, and the list of signatures is stored on a persistent storage device;

cache the locality table in memory, wherein each signature of the first group of signatures identifies a respective data unit of a plurality of data units that were consecutively added to a deduplicated data store on the persistent storage device;

search the locality table for a new signature of a new data unit, wherein the new signature is used to determine whether a copy of the new data unit is already present in the deduplicated data store;

access a pointer table, if the new signature is not found in the locality table, wherein the pointer table stores information indicating a set of the list of signatures stored on the persistent storage device; and search the set of the list of signatures for the new signature, in response to the accessing the pointer table.

14. The computer readable non-transitory storage medium of claim 13, wherein searching the locality table comprises performing a binary search of the first group of signatures in the locality table.

15. The computer readable non-transitory storage medium of claim 14, wherein the executable program instructions are further configured to access additional information in the locality table, wherein the additional information is associated with the new signature, wherein the additional information identifies when the copy of the new data unit was added to the deduplicated data store, relative to one or more other data units, and wherein the other data units are identified by other signatures in the locality table.

16. The computer readable non-transitory storage medium of claim 14, wherein the executable program instructions are further configured to access additional information in the locality table, wherein the additional information is associated with the new signature, and wherein the additional information identifies a location of the copy of the new data unit in the deduplicated data store.

17. The computer readable non-transitory storage medium of claim 13, wherein the executable program instructions are further configured to detect whether the new data unit has a predefined value.

18. The computer readable non-transitory storage medium of claim 17, wherein the executable program instructions are configured to search the locality table in response to detecting that the new data unit does not have a predefined value.

19. The computer readable non-transitory storage medium of claim 13, wherein the executable program instructions are further configured to prefetch a second locality table, in response to accessing a most recently created entry in the locality table.

20. The computer readable non-transitory storage medium of claim 13, wherein the executable program instructions are further configured to load a new locality table into the memory, in response to finding the new signature in the set of the list of signatures, wherein the new locality table comprises the new signature.

21. The computer readable non-transitory storage medium of claim 13, wherein accessing the pointer table comprises using a portion of the new signature as an index into the pointer table.

22. A system comprising:

means for generating a locality table, wherein
 a list of signatures is sub-divided into multiple groups of signatures,
 the locality table comprises a first group of signatures of the multiple groups of signatures, and
 the list of signatures is stored on a persistent storage device;

means for caching a locality table, wherein
 each signature of the first group of signatures identifies a respective data unit of a plurality of data units that were consecutively added to a deduplicated data store on the persistent storage device;

means for searching for a new signature of a new data unit in the locality table, wherein
 the new signature is used to determine whether a copy of the new data unit is already present in the deduplicated data store;

means for accessing a pointer table, in response to the new signature not being found in the locality table, wherein
 the pointer table stores information indicating a set of the list of signatures stored on the persistent storage device; and means for searching the set of the list of signatures for the new signature, in response to the pointer table being accessed.

23. The system of claim 22, wherein the means for searching the locality table comprises means to perform a binary search of the first group of signatures in the locality table.

24. The system of claim 22, further comprising means for detecting whether the new data unit has a predefined value, wherein
 the means for searching search the locality table in response to the means for detecting identifying that the new data unit does not have the predefined value.

25. The system of claim 22, further comprising means for prefetching a second locality table, in response to a most recently created entry in the locality table being accessed.

* * * * *